(12) United States Patent
Meagher et al.

(10) Patent No.: US 8,457,159 B2
(45) Date of Patent: Jun. 4, 2013

(54) OPTICAL TRANSPORT NETWORK HIERARCHY FOR FULL TRANSPARENT TRANSPORT OF DATACOM AND TELECOM SIGNALS

(75) Inventors: Kevin S. Meagher, Bowie, MD (US); Steven A. Surek, Leonardo, NJ (US)

(73) Assignee: Ciena Corporation, Hanover, MD (US)

( * ) Notice: Subject to any disclaimer, the term of this patent is extended or adjusted under 35 U.S.C. 154(b) by 1164 days.

(21) Appl. No.: 12/017,116

(22) Filed: Jan. 21, 2008

(65) Prior Publication Data

US 2008/0279553 A1 Nov. 13, 2008

Related U.S. Application Data

(60) Provisional application No. 60/917,490, filed on May 11, 2007.

(51) Int. Cl.
*H04J 3/1652* (2006.01)
(52) U.S. Cl.
USPC ............................................ 370/474; 398/45
(58) Field of Classification Search
CPC ...................................................... H04J 3/1652
USPC ........................................... 370/474; 398/45
See application file for complete search history.

(56) References Cited

U.S. PATENT DOCUMENTS

| | | | |
|---|---|---|---|
| 7,809,017 B2* | 10/2010 | Harley et al. | 370/474 |
| 2002/0027929 A1* | 3/2002 | Eaves | 370/505 |
| 2004/0202198 A1* | 10/2004 | Walker et al. | 370/474 |
| 2006/0104309 A1* | 5/2006 | Vissers et al. | 370/474 |
| 2007/0189336 A1* | 8/2007 | Zou | 370/505 |
| 2008/0044183 A1* | 2/2008 | Perkins et al. | 398/58 |

OTHER PUBLICATIONS

Trowbridge, Stephen, Mapping of 100 Gbit/s Ethernet into OTN and the need for a Lane Independent PCS, Alcatel-Lucent, Mar. 13-15, 2007.*
Gendron, Robert and Gidaro, Amato, The G.709 Optical Transport Network—An Overview, EXFO Application Note 153 (2006).*

* cited by examiner

*Primary Examiner* — Kibrom T Hailu
*Assistant Examiner* — Benjamin Lamont
(74) *Attorney, Agent, or Firm* — Clements Bernard PLLC; Christopher L. Bernard; Lawrence A. Baratta, Jr.

(57) ABSTRACT

The present invention provides an Optical Transport Network (OTN) hierarchy that supports full transparency for both Ethernet and Telecom signals. The present invention defines new rates and mapping/multiplexing methods to adapt transparent 10 Gigabit Ethernet (10 GBE) (255/238 and 255/237) and 10 Gigabit Fibre Chanel (10 GFC) (255/237) to Optical Channel Transport Unit-3 (OTU3) at a higher rate. Additionally, the present invention defines new rates and mapping/multiplexing methods to adapt future transparent 100 GBE into an Optical Channel Transport Unit-4-extended (OTU4e) which is an OTU4 at a higher rate to support full transparency.

19 Claims, 9 Drawing Sheets

| TYPE | GROUP | MSID Value | | | | | | | | |
|---|---|---|---|---|---|---|---|---|---|---|
| | | Hex | MSB 8 | 7 | 6 | 5 | 4 | 3 | 2 | LSB 1 |
| ODU1 | 0 | 0 | 0 | 0 | 0 | 0 | 0 | 0 | 0 | 0 |
| | 1 | 1 | 0 | 0 | 0 | 0 | 0 | 0 | 0 | 1 |
| | ... | | | | | | | | | |
| | 39 | 27 | 0 | 0 | 1 | 0 | 0 | 1 | 1 | 1 |
| RES | | 28 | 0 | 0 | 1 | 0 | 1 | 0 | 0 | 0 |
| | ... | | | | | | | | | |
| RES | | 3F | 0 | 0 | 1 | 1 | 1 | 1 | 1 | 1 |
| ODU2 | 0 | 40 | 0 | 1 | 0 | 0 | 0 | 0 | 0 | 0 |
| | 1 | 41 | 0 | 1 | 0 | 0 | 0 | 0 | 0 | 1 |
| | 9 | 49 | 0 | 1 | 0 | 0 | 1 | 0 | 0 | 1 |
| RES | | 4A | 0 | 1 | 0 | 0 | 1 | 0 | 1 | 0 |
| | ... | | | | | | | | | |
| RES | | 7F | 0 | 1 | 1 | 1 | 1 | 1 | 1 | 1 |
| ODU3 | 0 | 80 | 1 | 0 | 0 | 0 | 0 | 0 | 0 | 0 |
| | 1 | 81 | 1 | 0 | 0 | 0 | 0 | 0 | 0 | 1 |
| RES | | 82 | 1 | 0 | 0 | 0 | 0 | 0 | 1 | 0 |
| | ... | | | | | | | | | |
| RES | | BF | 1 | 0 | 1 | 1 | 1 | 1 | 1 | 1 |
| ODU2-GBE | 0 | C0 | 1 | 1 | 0 | 0 | 0 | 0 | 0 | 0 |
| | 1 | C1 | 1 | 1 | 0 | 0 | 0 | 0 | 0 | 1 |
| | ... | | | | | | | | | |
| | 9 | C9 | 1 | 1 | 0 | 0 | 1 | 0 | 0 | 1 |
| RES | | CA | 1 | 1 | 0 | 0 | 1 | 0 | 1 | 0 |
| | ... | | | | | | | | | |
| RES | | CF | 1 | 1 | 0 | 0 | 1 | 1 | 1 | 1 |
| ODU2-GBES | 0 | D0 | 1 | 1 | 0 | 1 | 0 | 0 | 0 | 0 |
| | 1 | D1 | 1 | 1 | 0 | 1 | 0 | 0 | 0 | 1 |
| | ... | | | | | | | | | |
| | 9 | D9 | 1 | 1 | 0 | 1 | 1 | 0 | 0 | 1 |
| RES | | DA | 1 | 1 | 0 | 1 | 1 | 0 | 1 | 0 |
| | ... | | | | | | | | | |
| RES | | DF | 1 | 1 | 0 | 1 | 1 | 1 | 1 | 1 |
| ODU3-GBE | 0 | E0 | 1 | 1 | 1 | 0 | 0 | 0 | 0 | 0 |
| | 1 | E1 | 1 | 1 | 1 | 0 | 0 | 0 | 0 | 1 |
| RES | | E2 | 1 | 1 | 1 | 0 | 0 | 0 | 1 | 0 |
| | ... | | | | | | | | | |
| RES | | EF | 1 | 1 | 1 | 0 | 1 | 1 | 1 | 1 |
| ODU4-GBE | 0 | F0 | 1 | 1 | 1 | 1 | 0 | 0 | 0 | 0 |
| RES | | F1 | 1 | 1 | 1 | 1 | 0 | 0 | 0 | 1 |
| | ... | | | | | | | | | |
| RES | | FF | 1 | 1 | 1 | 1 | 1 | 1 | 1 | 1 |

Signal Rates Derived with 3 digit M and N

| SIGNAL | Bit Rate (Gb/s) | M | N |
|---|---|---|---|
| CBR2G5 | 2.4883 | | |
| OPU1 | 2.4883 | 238 | 238 |
| ODU1 | 2.4988 | 239 | 238 |
| OTU1 | 2.6661 | 255 | 238 |
| CBR10G | 9.9533 | | |
| OPU2 | 9.9953 | 238 | 237 |
| ODU2 | 10.0373 | 239 | 237 |
| OTU2 | 10.7092 | 255 | 237 |
| CBR10G3125 | 10.3125 | | |
| OPU2L | 10.3125 | 238 | 238 |
| ODU2L | 10.3558 | 239 | 238 |
| OTU2L | 11.0491 | 255 | 238 |
| OPU2e | 10.3560 | 238 | 237 |
| ODU2e | 10.3995 | 239 | 237 |
| OTU2e | 11.0957 | 255 | 237 |
| CBR40G | 39.8131 | | |
| OPU3 | 40.1505 | 238 | 236 |
| ODU3 | 40.3192 | 239 | 236 |
| OTU3 | 43.0184 | 255 | 236 |
| CBR41G25 | 41.2500 | | |
| OPU3e | 41.5996 | 238 | 236 |
| ODU3e | 41.7744 | 239 | 236 |
| OTU3e | 44.5710 | 255 | 236 |
| CBR103G125 | 103.1250 | | |
| OPU4e | 104.4415 | 238 | 235 |
| ODU4e | 104.8803 | 239 | 235 |
| OTU4e | 111.9016 | 255 | 235 |
| CBR1G25 | 1.2500 | | |
| OPU1e | 1.2500 | 238 | 238 |
| ODU1e | 1.2553 | 239 | 238 |
| OTU1e | 1.3393 | 255 | 238 |

310

Alternate Signal Rates
Derived with many digit M and N

| SIGNAL | Bit Rate (Gb/s) | M | N |
|---|---|---|---|
| 40GBE | 41.250 | | |
| OPU3e | 41.598 | 239 | 237 |
| ODU3e | 41.773 | 57,121 | 56,406 |
| OTU3e | 44.569 | 1,195 | 1,106 |
| 100GBE | 103.125 | | |
| OPU4e | 104.652 | 114,242 | 112,575 |
| ODU4e | 105.092 | 13,651,919 | 13,396,425 |
| OTU4e | 112.127 | 57,121 | 52,535 |

*FIG. 7.*

| Mapping/Multiplexing | Columns used | Fixed Stuff Columns | Fixed Stuff Bytes | Multi-Frame Stuff Bytes | Additional Payload Byte |
|---|---|---|---|---|---|
| ODU1 to ODU2 Multiplexing | 952 | | | | |
| ODU1 to ODU2L Multiplexing | 952 | -29 | -1 | | |
| ODU1 to ODU2e Multiplexing | 952 | -33 | | -2 | |
| ODU1 to ODU3 Multiplexing | 238 | -1 | | | |
| ODU1 to ODU3e Multiplexing | 238 | -9 | -1 | | |
| ODU1 to ODU4e Multiplexing | 95 | -3 | -3 | -20 | |
| Asynchronous CBR10G Mapping | 3808 | -16 | | | |
| Asynchronous CBR10G Mapping | 3808 | -132 | -2 | | |
| Asynchronous CBR10G Mapping | 3808 | -148 | | | |
| ODU2 to ODU3 Multiplexing | 952 | | | | |
| ODU2 to ODU3e Multiplexing | 952 | -33 | 0 | -2 | |
| ODU2 to ODU4e Multiplexing | 380 | -14 | | | |
| Asynchronous CBR10G3125 Mapping | 3808 | | | | 1 |
| ODU2L to ODU3e Multiplexing | 952 | -3 | -3 | -2 | |
| ODU2L to ODU4e Multiplexing | 380 | -2 | -1 | -5 | |
| Asynchronous CBR10G3125 Mapping | 3808 | -16 | | | 1 |
| ODU2e to ODU3e Multiplexing | 952 | | | | 1 |
| ODU2e to ODU4e Multiplexing | 380 | | -3 | | |
| Asynchronous CBR40G Mapping | 3808 | -163 | -2 | | |
| ODU3 to ODU4e Multiplexing | 1524 | -53 | -3 | | |
| Asynchronous CBR41G25 Mapping | 3808 | -32 | | | 1 |
| ODU3e to ODU4e Multiplexing | 1524 | | -3 | | |
| Asynchronous CBR103G125 Mapping | 3808 | -48 | | | 1 |
| ODU2L to ODU2e Multiplexing | 3808 | | | | 1 |
| ODU1e to ODU2e Multiplexing | 476 | -14 | -1 | -4 | |
| ODU1e to ODU3e Multiplexing | 119 | -4 | | -10 | |
| ODU1e to ODU4e Multiplexing | 47 | | | | |

*FIG. 8.*

Table 1: Sample Mapping Containers for 100GBE into 112G OTU4

| Mapping | Columns Used | Fixed Stuff Columns | Fixed Stuff Bytes | Notes |
|---|---|---|---|---|
| Map a 100GBE into an ODU4e | 3800 | 55 | 0 | Requires positive justification range only |
| Map a 100GBE into an ODU4e | 3800 | 56 | 0 | Requires justification range from 2 NJO to 2 PJO |

Table 2: Sample Multiplexing Formats for multiplexing tributaries into 112G OTU4e

| Multiplexing Format | Container | Cols used for trib | Fixed Stuff Columns | Fixed Stuff Bytes | Notes |
|---|---|---|---|---|---|
| Mux an ODU3 into an ODU4E | ODTU43 | 1520 | 56 | 0 | |
| Mux an ODU2 into an ODU4E | ODTU42 | 380 | 15 | 2 | |
| Mux an ODU1 into an ODU4E | ODTU41 | 95 | 4 | 1 | |
| Mux an ODU2E into an ODU4E | ODTU42E | 380 | 2 | 1 | |
| Mux an ODU2L into an ODU4E | ODTU42L | 380 | 4 | 0 | |
| Mux an ODU3E into an ODU4E | ODTU43E | 1520 | 3 | 0 | |
| Mux an ODU2FC10 into an ODU4E | ODTU42FC10 | 475 | 91 | 1 | 10G Fibre Channel ODU2FC10 = 10,518,750,000 bps *239/238 |
| Mux an ODU2FC8 into an ODU4E | ODTU42FC8 | 380 | 70 | 0 | 8G Fibre Channel ODU2FC8 =8,500,000,000 bps *239/238 |

*FIG. 9.*

OPTICAL TRANSPORT NETWORK HIERARCHY FOR FULL TRANSPARENT TRANSPORT OF DATACOM AND TELECOM SIGNALS

CROSS-REFERENCE TO RELATED APPLICATION(S)

The present non-provisional patent application claims priority to U.S. Provisional Patent Application Ser. No. 60/917,490, filed May 11, 2007, and entitled "AN OPTICAL TRANSPORT NETWORK HIERARCHY FOR FULL TRANSPARENT TRANSPORT OF DATACOM AND TELECOM SIGNALS," which is incorporated in full by reference herein.

FIELD OF THE INVENTION

The present invention relates generally to optical networking. More specifically, the present invention provides an Optical Transport Network (OTN) hierarchy that supports full transparency for both Datacom (e.g., Ethernet) and Telecom signals.

BACKGROUND OF THE INVENTION

ITU-T defines Optical Transport Network (OTN) as a set of Optical Network Elements connected by optical fiber links, able to provide functionality of transport, multiplexing, routing, management, supervision and survivability of optical channels carrying client signals. Of note, OTN is defined in: ITU-T G.709 "Interfaces for the optical transport network (OTN)"; ITU-T G.798 "Characteristics of optical transport network hierarchy equipment functional blocks"; OTN Standard FEC (Called GFEC sometimes) is defined in ITU-T G.975; OTN Jitter is defined in ITU-T G.8251 "The control of jitter and wander within the optical transport network (OTN)"; ITU-T G.870 "Terms and definitions for Optical Transport Networks (OTN)"; ITU-T G.871 "Framework for optical transport network Recommendations"; ITU-T G.873.1 "Optical Transport Network (OTN): Linear protection"; ITU-T G.874 "Management aspects of the optical transport network element"; ITU-T G.874.1 "Optical transport network (OTN): Protocol-neutral management information model for the network element view"; ITU-T G.959.1 "Optical transport network physical layer interfaces"; and ITU-T G.8201 "Error performance parameters and objectives for multi-operator international paths within the Optical Transport Network (OTN)".

Disadvantageously, OTN provides for full transparency only with telecom signals, and not with datacom signals, such as 10 Gigabit Ethernet (10 GBE), 10 Gigabit Fibre Chanel (10 GFC), future 100 Gigabit Ethernet (100 GBE), and the like. Transport carriers, such as long-haul providers, prefer 100% bit transparent transport of datacom signals for various reasons. For instance, transparent transport provides simpler provisioning providing a connection that emulates fiber. Another reason is that some routers use the preamble and 64 B/66 B code words for proprietary control and data channels and dropping those bits disrupts router-to-router communications.

BRIEF SUMMARY OF THE INVENTION

The present invention provides an Optical Transport Network (OTN) hierarchy that supports full transparency for both Ethernet and Telecom signals. The present invention defines new rates and mapping/multiplexing methods to adapt transparent 10 Gigabit Ethernet (10 GBE) (255/238 and 255/237) and 10 Gigabit Fibre Chanel (10 GFC) (255/237) to Optical Channel Transport Unit-3 (OTU3) at a higher rate. Additionally, the present invention defines new rates and mapping/multiplexing methods to adapt future transparent 100 GBE into an Optical Channel Transport Unit-4-extended (OTU4e) which is an OTU4 at a higher rate to support full transparency.

The present invention accommodates standard Optical Channel Data Unit-1 (ODU1) mappings into new Optical Channel Data Unit-2-extended (ODU2e) and Optical Channel Data Unit-3-extended (ODU3e), accommodates standard Optical Channel Data Unit-2 (ODU2) mappings/multiplexing into ODU2e and ODU3e, accommodates standard Optical Channel Data Unit-3 (ODU3) mappings/multiplexing into ODU3E, accommodates 40 Gigabit Ethernet (40 GBE) (not standard yet) 40*66/64 into ODU3E, accommodates Optical Channel Data Unit-4 (ODU4) (not standard yet) mappings/multiplexing into an ODU4e, uses Fixed Stuff (FS) columns to adapt slower clients/tribs, uses two columns of Positive Justification Opportunities (PJOs) to provide a wider frequency justification range from FS column payloads. ODU2L and ODU3e rates may be offset above 11.05/11.1*239/255. The present invention uses n×NJO/PJO (Negative Justification Opportunities/Positive Justification Opportunities) to accommodate +/−100 ppm (parts per million) clients/tribs.

In an exemplary embodiment of the present invention, an Optical Transport Network multiplexing method for full transparent transport of datacom and telecom signals includes receiving one or more client signals; assigning the one or more client signals to a set of time slots of a plurality of time slots in an Optical Channel Payload Unit; and utilizing one or more of fixed stuff columns, fixed stuff bytes, a multi-frame stuff byte, and an additional payload byte to bias a justification range required for the one or more client signals in the set of time slots. The multiplexing method supports synchronous and asynchronous transparent transport of +/−100 parts per million signals. The fixed stuff columns are added to a payload area per frame of the Optical Channel Payload Unit as required for coarse adjustments; one to three fixed stuff bytes are added to a column in the payload area as required; the multi-frame stuff bytes are added to one or more frames in a multi-frame as required; and the additional payload byte is added to an Optical Channel Payload Unit overhead as required to increase payload capacity by one byte per frame.

Optionally, the Optical Transport Network multiplexing method further includes utilizing a multiplex signal identification in an Optical Channel Payload Unit overhead to indicate the assignment of the one or more client signals to the set of time slots. The multiplex signal identification in the Optical Channel Payload Unit overhead enables flexible time slot assignment of the one or more client signals. Alternatively, the Optical Transport Network multiplexing method further includes utilizing a multi-frame identification in the Optical Channel Payload Unit overhead to support ×2, ×4, ×5, ×10, ×16, ×20, ×32, ×40, ×80, ×160, and combinations thereof multiplexing of the one more client signals. The Optical Transport Network multiplexing method can further include mapping the Optical Channel Payload Unit into an Optical Channel Data Unit; and mapping the Optical Channel Data Unit into an Optical Channel Transport Unit. Optionally, the Optical Channel Transport Unit includes an Optical Channel Transport Unit-4-extended (OTU4e), wherein the OTU4e includes one of a signal rate of 103.125 Gb/s*255/235 and a signal rate of 103.125 Gb/s*255/234; wherein the Optical Channel Data Unit includes an Optical Channel Data Unit-4-extended (ODU4e); and the Optical Channel Payload Unit includes an the Optical Channel Payload Unit-4-extended (OPU4e), wherein the OPU4e includes forty time slots and eight multi-purpose columns.

In another exemplary embodiment of the present invention, an Optical Transport Network mapping method for full transparent transport of datacom and telecom signals includes receiving a client signal; assigning the client signal to an Optical Channel Payload Unit; and utilizing one or more of fixed stuff columns, fixed stuff bytes, multi-frame stuff bytes, and additional payload bytes to bias a justification range required for the client signal in the Optical Channel Payload Unit. The mapping method supports synchronous and asynchronous transparent transport of +/−100 parts per million signals. The fixed stuff columns are added to a payload area per frame of the Optical Channel Payload Unit as required for coarse adjustments; one to three fixed stuff bytes are added to a column in the payload area as required; the multi-frame stuff bytes are added to one or more frames in a multi-frame as required; and the additional payload byte is added to an Optical Channel Payload Unit overhead as required to increase payload capacity by one byte per frame.

Optionally, the Optical Transport Network mapping method further includes mapping the Optical Channel Payload Unit into an Optical Channel Data Unit; and mapping the Optical Channel Data Unit into an Optical Channel Transport Unit. Alternatively, the client signal includes one of a 10 Gigabit Ethernet, a 40 Gigabit Ethernet, a 100 Gigabit Ethernet, a 10 Gigabit Fibre Channel, and a 8 Gigabit Fibre Channel. Optionally, the Optical Channel Transport Unit includes an Optical Channel Transport Unit-4-extended (OTU4e), wherein the OTU4e includes one of a signal rate of 103.125 Gb/s*255/235 and a signal rate of 103.125 Gb/s*255/234; the Optical Channel Data Unit includes an Optical Channel Data Unit-4-extended (ODU4e); and the Optical Channel Payload Unit includes an the Optical Channel Payload Unit-4-extended (OPU4e), wherein the OPU4e includes forty time slots and eight multi-purpose columns.

In yet another exemplary embodiment of the present invention, an Optical Transport Network element configured full transparent transport of datacom and telecom signals includes a tributary interface configured to receive a client signal including one of a plurality of client signal types; a line interface coupled to the tributary interface, wherein the line interface is configured to output the client signal in an Optical Transport Network frame, wherein the client signal is fully transparent within the Optical Transport Network frame, and wherein the Optical Transport Network frame utilizes an increased rate; wherein the Optical Transport Network element utilizes one or more of fixed stuff columns, fixed stuff bytes, a multi-frame stuff byte, and an additional payload byte to bias a justification range required for the client signal in the Optical Transport Network frame. The line interface supports synchronous and asynchronous transparent transport of +/−100 parts per million signals.

The fixed stuff columns are added to a payload area per frame of an Optical Channel Payload Unit as required for coarse adjustments; one to three fixed stuff bytes are added to a column in the payload area as required; the multi-frame stuff bytes are added to one or more frames in a multi-frame as required; and the additional payload byte is added to an Optical Channel Payload Unit overhead as required to increase payload capacity by one byte per frame. Optionally, the Optical Transport Network element is configured to: map the client signal into an Optical Channel Payload Unit; map the Optical Channel Payload Unit into an Optical Channel Data Unit; and map the Optical Channel Data Unit into an Optical Channel Transport Unit. Alternatively, the client signal includes one of a 10 Gigabit Ethernet, a 40 Gigabit Ethernet, a 100 Gigabit Ethernet, a 10 Gigabit Fibre Channel, and a 8 Gigabit Fibre Channel.

BRIEF DESCRIPTION OF THE DRAWINGS

The present invention is illustrated and described herein with reference to the various drawings, in which like reference numbers denote like method steps and/or system components, respectively, and in which:

FIG. 6 is a table illustrating MSID values for various signal types according to an exemplary embodiment of the present invention;

FIG. 7 is tables illustrating signal rates with three digit M and N and alternate signal rates derived with many digit M and N according to an exemplary embodiment of the present invention;

FIG. 8 is a table illustrating mapping and multiplexing formats according to an exemplary embodiment of the present invention; and FIG. 9 is tables illustrating mapping and multiplexing of a 112 G OTU4e signal according to another exemplary embodiment of the present invention.

DETAILED DESCRIPTION OF THE INVENTION

The present invention provides an Optical Transport Network (OTN) hierarchy that supports full transparency for both Ethernet and Telecom signals. The present invention defines new rates and mapping/multiplexing methods to adapt transparent 10 Gigabit Ethernet (10 GBE) (255/238 and 255/237) and 10 Gigabit Fibre Chanel (10 GFC) (255/237) to Optical Channel Transport Unit-3 (OTU3) at a higher rate. Additionally, the present invention defines new rates and mapping/multiplexing methods to adapt future transparent 100 GBE into an Optical Channel Transport Unit-4-extended (OTU4e) which is an OTU4 at a higher rate to support full transparency.

The present invention accommodates standard Optical Channel Data Unit-1 (ODU1) mappings into new Optical Channel Data Unit-2-extended ODU2e and Optical Channel Data Unit-3-extended (ODU3e), accommodates standard Optical Channel Data Unit-2 (ODU2) mappings/multiplexing into ODU2e and ODU3e, accommodates standard Optical Channel Data Unit-3 (ODU3) mappings/multiplexing into ODU3E, accommodates 40 Gigabit Ethernet (40 GBE) (not standard yet) 40*66/64 into ODU3E, accommodates Optical Channel Data Unit-4 (ODU4) (not standard yet) mappings/multiplexing into an ODU4e, uses Fixed Stuff (FS) columns to adapt slower clients/tribs, uses two columns of Positive Justification Opportunities (PJOs) to provide a wider frequency justification range from FS column payloads. ODU2L and ODU3e rates may be offset above 11.05/11.1*239/255. The present invention uses nxNJO/PJO (Negative Justification Opportunities/Positive Justification Opportunities) to accommodate +/−100 ppm (parts per million) clients/tribs.

Figure 1:
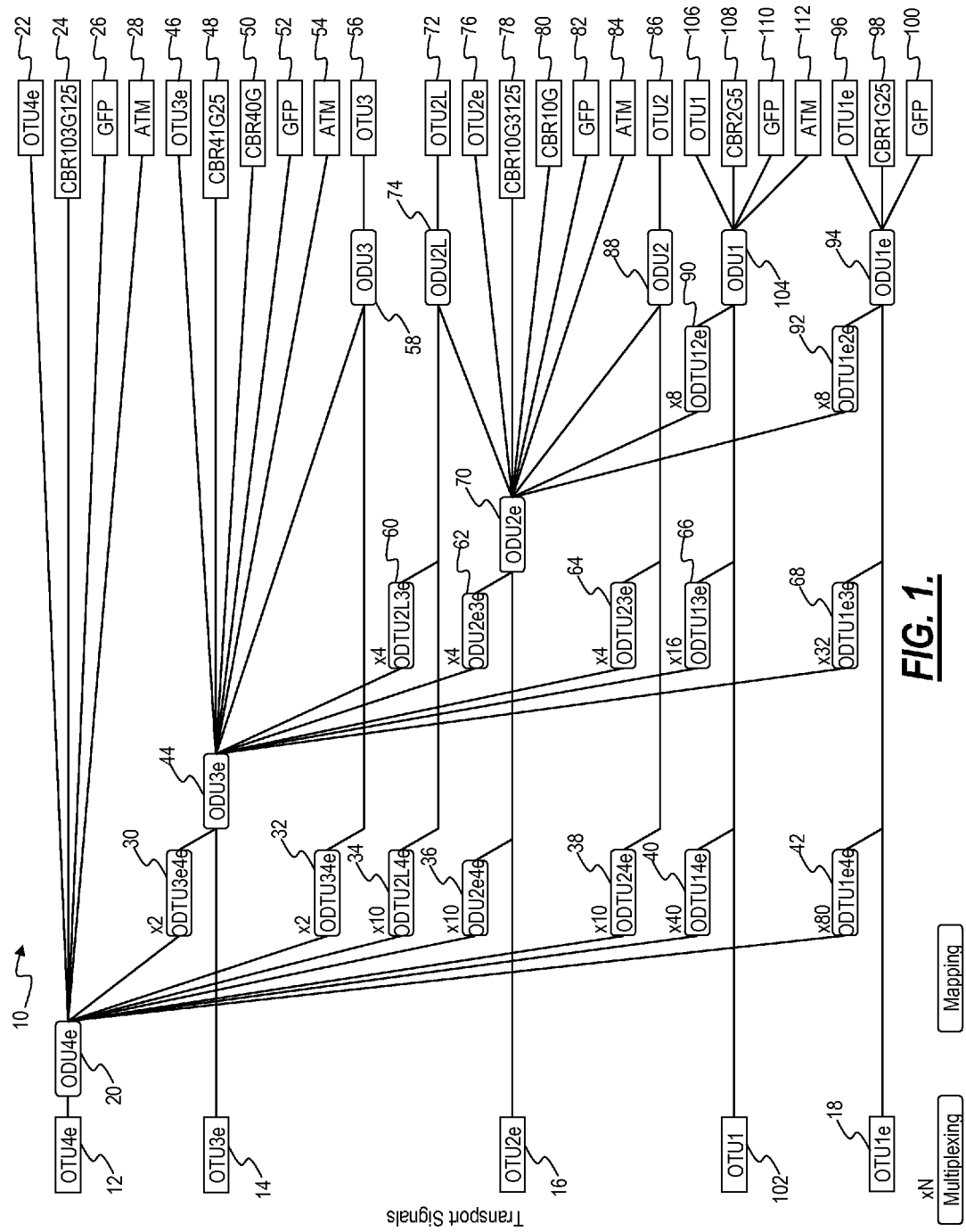
FIG. 1 is an Optical Transport Network (OTN) hierarchy for transparent mapping/multiplexing of datacom and telecom signals according to an exemplary embodiment of the present invention.

Referring to FIG. 1, an OTN hierarchy 10 is illustrated for transparent mapping/multiplexing of datacom and telecom signals according to an exemplary embodiment of the present invention. The hierarchy 10 defines higher rate signals to support full transparency of mapped/multiplexed signals. An Optical Transport Unit-4 extended (OTU4e) 12 is defined as approximately 111.9016 Gb/s which is 103.125 Gb/s*255/235. The OTU4e 12 utilizes a 4080x4 row frame as defined in ITU-T G.709. The OTU4e 12 is configured to provide synchronous and asynchronous transport of +/−100 ppm datacom signals including both asynchronous mapping supporting +/−100 ppm clients and asynchronous multiplexing supporting +/−100 ppm tributary clients.

An Optical Transport Unit-3 extended (OTU3e) 14 is defined as approximately 44.5710 Gb/s which is 41.25 Gb/s*255/236. The OTU3e 14 utilizes the 4080x4 row frame as defined in ITU-T G.709. The OTU3e 14 is configured to provide synchronous and asynchronous transport of +/−100 ppm datacom signals including both asynchronous mapping supporting +/−100 ppm clients and asynchronous multiplexing supporting +/−100 ppm tributary clients.

An Optical Transport Unit-2 extended (OTU2e) 16 is defined as approximately 11.09 Gb/s which is 10.3125 Gb/s*255/237. The OTU2e 16 utilizes the 4080x4 row frame as defined in ITU-T G.709. The OTU2e 16 is configured to provide synchronous and asynchronous transport of +/−100 ppm datacom signals including both asynchronous mapping supporting +/−100 ppm clients and asynchronous multiplexing supporting +/−100 ppm tributary clients.

An Optical Transport Unit-1 extended (OTU1e) 18 is defined as approximately 1.3393 Gb/s which is 1.25 Gb/s*255/238. The OTU1e 18 utilizes the 4080x4 row frame as defined in ITU-T G.709. The OTU2e 16 is configured to provide synchronous and asynchronous transport of +/−100 ppm datacom signals including synchronous mapping supporting +/−100 ppm clients.

The OTN hierarchy 10 illustrates some exemplary mapping and multiplexing scenarios associated with some sample client signals. Those of ordinary skill in the art will recognize that these scenarios are provided for illustration and could include additional client signals as are known in the art.

The OTU4e 12 is formed from an Optical Channel Data Unit-4-extended (ODU4e) 20. For example, various client signals, such as an OTU4e 22, CBR103G125 24, GFP 26, ATM 28, and the like, can be transparently mapped into the ODU4e 20. The ODU4e 20 can support various signals transparently multiplexed. The various mappings and multiplexings which are associated with the OTU4e 12 and the ODU4e 20 include:

---

Optical Channel Data Tributary Unit 3e into 4e (ODTU3e4e) 30
Optical Channel Data Tributary Unit 3 into 4e (ODTU34e) 32
Optical Channel Data Tributary Unit 2-LAN into 4e (ODTU2L4e) 34
Optical Channel Data Tributary Unit 2e into 4e (ODTU2e4e) 36
Optical Channel Data Tributary Unit 2 into 4e (ODTU24e) 38
Optical channel Data Tributary Unit 1 into 4e (ODTU14e) 40
Optical channel Data Tributary Unit 1e into 4e (ODTU1e4e) 42

---

The OTU3e 14 is formed from an Optical Channel Data Unit-3-extended (ODU3e) 44. For example, various client signals, such as an OTU3e 46, CBR41G25 48, CBR40G 50, GFP 52, ATM 54, an Optical Transport Unit-3 (OTU3) 56 mapped into an Optical Channel Data Unit-3 (ODU3) 58, and the like, can be transparently mapped into the ODU3e 44. The ODU3e 44 can support various signals transparently multiplexed. The various mappings and multiplexings which are associated with the OTU3e 14 and the ODU3e 44 include:

---

Optical Channel Data Tributary Unit 2-LAN into 3e (ODTU2L3e) 60
Optical Channel Data Tributary Unit 2e into 3e (ODTU2e3e) 62
Optical Channel Data Tributary Unit 2 into 3e (ODTU23e) 64
Optical Channel Data Tributary Unit 1 into 3e (ODTU13e) 66
Optical Channel Data Tributary Unit 12 into 3e (ODTU1e3e) 68

---

The OTU2e 16 is formed from an Optical Channel Data Unit-2-extended (ODU2e) 70. For example, various client signals, such as an Optical Transport Unit-2L (OTU2L) 72 mapped into an Optical Channel Data Unit-2L (ODU2L) 74, OTU2e 76, CBR10G3125 78, CBR10G 80, GFP 82, ATM 84, an Optical Transport Unit-2 (OTU2) 86 mapped into an Optical Channel Data Unit-2 (ODU2) 88, and the like, can be transparently mapped into the ODU2e 70. The OTU2L has a bit rate of 11.05 Gb/s and the OTU2e has a bit rate of 11.09 Gb/s. The ODU2e 70 can support various signals transparently multiplexed. The various mappings and multiplexings which are associated with the OTU2e 16 and the ODU2e 70 include:

---

Optical Channel Data Tributary Unit 1 into 2e (ODTU12e) 90
Optical Channel Data Tributary Unit 1e into 2e (ODTU1e2e) 92

---

The OTU1e 18 is formed from an Optical Channel Data Unit-1-extended (ODU2e) 94. For example, various client signals, such as an OTU1e 96, CBR1G125 98, GFP 100, and the like, can be transparently mapped into the ODU1e 94. An Optical Transport Unit-1 (OTU1) 102 is formed from an Optical Channel Data Unit-1 (ODU1) 104. For example, various client signals, such as an Optical Transport Unit-1 (OTU1) 106, CBR2G5 108, GFP 110, ATM 112, and the like, can be transparently mapped into the ODU1 104.

The ODU4e 20 can support various transparent multiplexing combinations as illustrated in the OTN hierarchy 10. For example, the ODU4e 20 can support 1 to 2 ODU3e 44 (through ODTU3e4e) 30, 1 to 2 ODU3 58 (through ODTU34e 32), 1 to 10 ODU2e 70 (through ODTU2e4e 36), 1 to 10 ODU2 88 (through ODTU24e 38), 1 to 80 ODU1e 94 (though ODTU1e4e 42), and 1 to 40 ODU1 104 (through ODTU14e 40). Additionally, the previous combinations can include mixtures, such as, for example, 2×ODU3e 44+2× ODU2e 70, ODU3e 44+ODU3 58+ODU2e 70+2×ODU1 104+4×ODU1e 94, etc.

The ODU3e 44 can support various transparent multiplexing combinations as illustrated in the OTN hierarchy 10. For example, the ODU3e 44 can support 1 to 4 ODU2e 70 (through ODTU2e3e 62), 1 to 4 ODU2 88 (through ODTU23e 64), 1 to 32 ODU1e 94 (through ODTU1e3e 68), and 1 to 16 ODU1 104 (through ODTU13e 66). Additionally, the previous combinations can include mixtures, such as, for example, 4×ODU2e 70, 2×ODU2e 70+4×ODU1 104+8× ODU1e 94, etc.

The ODU2e 70 can support various transparent multiplexing combinations as illustrated in the OTN hierarchy 10. For example, the ODU2e 70 can support 1 to 8 ODU1e 94 (through ODTU1e2e 92) and 1 to 4 ODU1 104 (through ODTU12e 90). Additionally, the previous combinations can include mixtures, such as, for example, 3×ODU1 104+2× ODU1e 94, etc. GFP 26,52,82,100,110 supports mapping for packet data, such as Ethernet, IP/MPLS, Infiniband, Fibre Channel, etc. ATM 28,54,84,112 supports ATM cell mapping.

Figure 2:
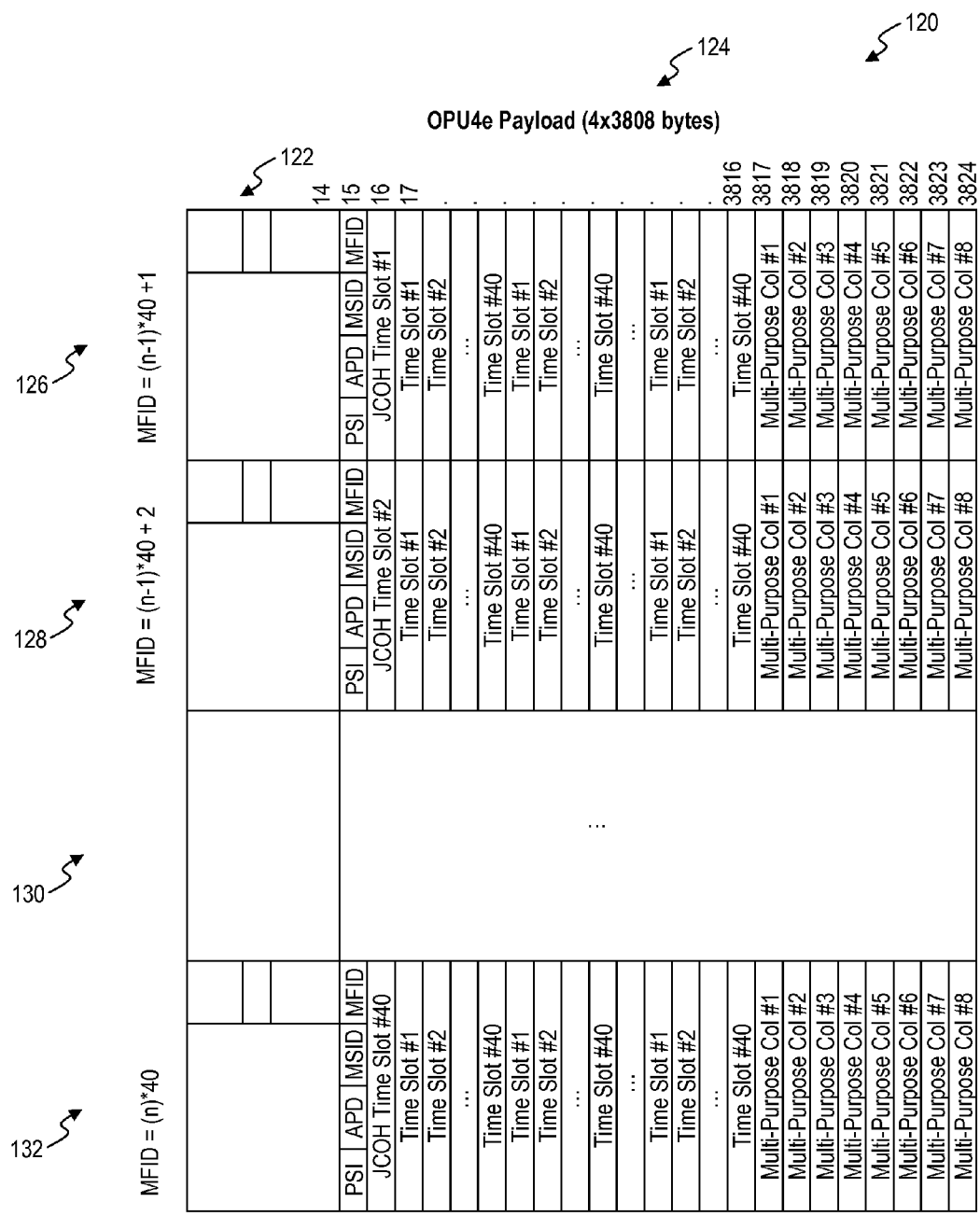
FIG. 2 is a timeslot diagram of Optical Channel Payload Unit-4-extended (OPU4e) multiplexing with 40 timeslots according to an exemplary embodiment of the present invention.

Referring to FIG. 2, Optical Channel Payload Unit-4-extended (OPU4e) 120 multiplexing is illustrated with 40 timeslots according to an exemplary embodiment of the present invention. The OPU4e 120 frame includes 4 rows by 3824 columns. OPU4e overhead 122 is located in columns 1 to 15. OPU4e payload 124 is located in columns 16 through 3824. The OPU4e payload 124 includes 40 timeslots (labeled as time slot #1, time slot #2, etc. in FIG. 2) and 8 multipurpose columns (MPC) (labeled as multi-purpose col. #1, multi-purpose col. #2, etc. in FIG. 2). The 40 timeslots occupy a total of 95 columns from column 18 through column 3816, and the 8 MPC occupy columns 3817 through 3824. The MPC enable extended bit-rates to allow for full transparency of datacom signals.

The 2×ODTU1e2e and ODTU14e utilize a single time slot. The ODTU24e and ODTU2e4e utilize four time slots. The ODTU34e and ODTU3e4e utilize sixteen time slots plus four MPC. The OPU4e 120 supports a new OPUk Multi-frame ID (MFID) located in the OPU4e overhead 122 at column 15, row 1. The MFID is incremented in each frame 126,128,130, 132 and rolls over to 0 at 159, i.e. a 160 frame multiframe counter. The MFID is not aligned to the Multi-Frame Alignment Signal (MFAS), and supports ×2, ×4, ×5, ×10, ×16, ×20, ×32 and ×40 tributary multiplexing with future support for ×80, ×160, etc.

The OPU4e 120 supports a new Multipex Signal ID (MSID) located in the OPU4e overhead 122 at column 1, row 2. The MSID is synchronized to the MFID and indicates time slot group (also know as tributary ID) and ODUj level for each time slot. The OPU4e payload 124 includes shared justification control overhead (JCOH) in column 16, and the JCOH is tied to the MFID. The OPU4e overhead 122 includes a new additional payload byte (APD) located in row 15, column 3. The APD is synchronized to the MFID. The APD is a shared tributary payload data byte used in some mappings to accommodate +/−100 ppm clients (note: this is not a NJO byte).

Figure 3:
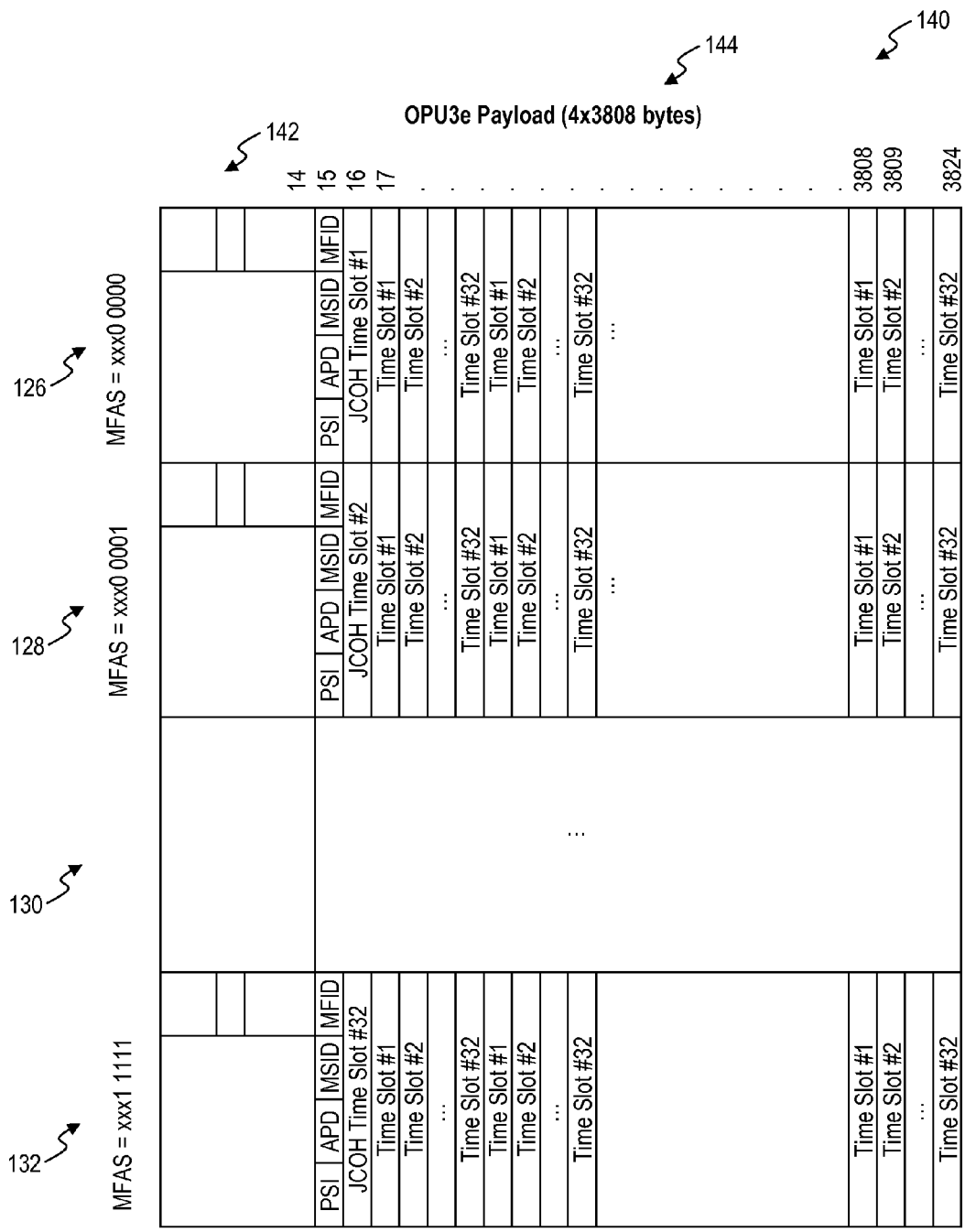
FIG. 3 is a timeslot diagram of Optical Channel Payload Unit-3-extended (OPU3e) multiplexing with 32 timeslots according to an exemplary embodiment of the present invention.

Referring to FIG. 3, Optical Channel Payload Unit-3-extended (OPU3e) 140 multiplexing is illustrated with 16 timeslots according to an exemplary embodiment of the present invention. The OPU3e 140 frame includes 4 rows by 3824 columns. OPU3e overhead 142 is located in columns 1 to 15. OPU3e payload 144 is located in columns 16 through 3824. The OPU3e payload 144 includes 16 timeslots (labeled as time slot #1, time slot #2, etc. in FIG. 3). The 16 timeslots occupy a total of 119 columns from column 18 through column 3824.

The 1×ODTU1e3e utilize a single time slot. The ODTU13e utilizes two time slots, and ODTU23e and ODTU2e3e utilize eight time slots. The OPU3e 140 supports a new Multipex Signal ID (MSID) located in the OPU3e overhead 142 at column 1, row 2. The MSID is synchronized to the MFID and indicates time slot group (also know as tributary ID) and ODUj level for each time slot. The OPU3e payload 144 includes shared justification control overhead (JCOH) in column 16, and the JCOH is tied to the MFID. The OPU3e overhead 142 includes a new additional payload byte (APD) located in row 15, column 3. The APD is synchronized to the MFID. The APD is a shared tributary payload data byte used in some mappings to accommodate +/−100 ppm clients (note: this is not a NJO byte).

Figure 4:
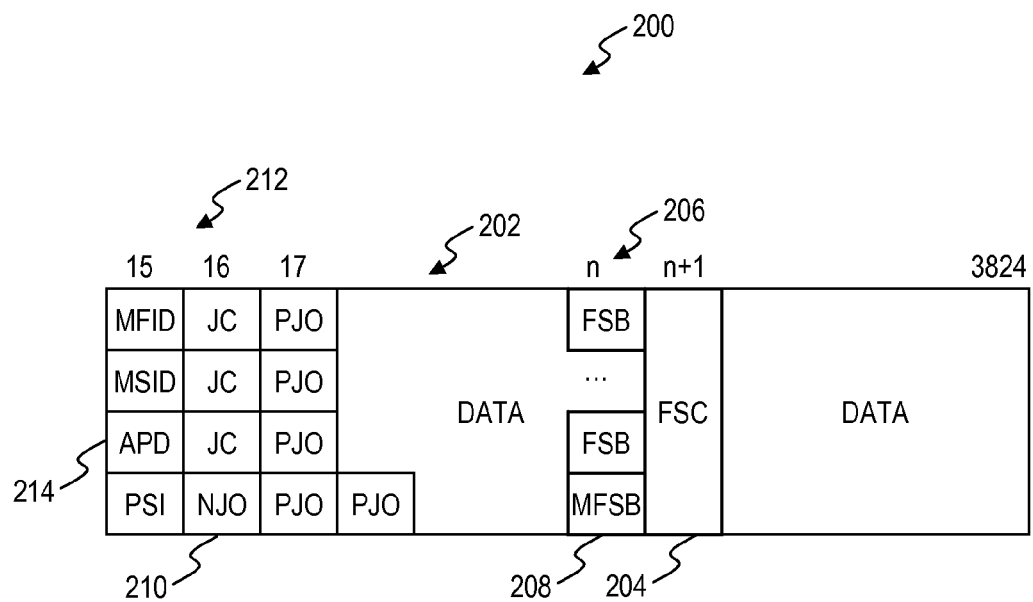
FIG. 4 is a diagram of a data-based Optical Channel Payload Unit-k (OPUk) payload which is adapted to accommodate various client rates according to an exemplary embodiment of the present invention.

Referring to FIG. 4, a data-based Optical Channel Payload Unit-k (OPUk) payload 200 is adapted to accommodate various client rates according to an exemplary embodiment of the present invention. The maximum payload capacity of the data-based OPUk 200 is determined by the transport signal rate (OTUk). Accordingly, accommodating many different client signal types and rates requires adjusting the capacity of a payload container 202 to match the client signal. Coarse adjustments can be made by adding one or more fixed stuff columns (FSC) 204 to the payload 202 area per frame. This effectively reducing the capacity of the OPUk payload 200. Each fixed stuff column 204 reduces the payload capacity by four bytes (1 column by 4 rows). This is the mechanism used in ITU-T G.709.

The data-based OTN hierarchy of the present invention also accommodates a much broader range of client signals since both telecom and datacom clients are supported as Constant Bit Rate (CBR) Signals. The FSC 204 method alone is often to coarse of an adjustment and further fine tuning adjustments are necessary. For example, one to three Fixed Stuff Bytes (FSB) 206 can be added to a column to reduce the per frame capacity by one to three bytes as necessary.

Multiplexed signals use only a fraction of the payload capacity sharing the payload 200 with two or more client signals. As a result each client container requires a two or more frame multi-frame for complete transport. For some of these signals even the FSB 206 mechanism is too coarse. A Multi-frame fixed stuff byte (MFSB) 208 can be added to one or more of the frames in a multi-frame to further reduce payload capacity.

Accommodating some client signals with wide ppm clock specifications can require a range of four (+/− two) or more justification opportunities. Adding additional NJO's 210 to OPUk overhead 212 is not desirable since the OPUk overhead 212 is at a premium, i.e. does not have available space. Adjusting the payload 200 capacity so that it is slightly higher than necessary has the effect of adding a positive bias to the justification requirements and reducing the need for negative justification opportunities 220.

One way to increase payload capacity is to remove stuff bytes from the frame or multi-frame. Tweaking the combination of FSC 204, FSB 206, and MFSB 208 can provide precise control over the payload capacity and the required justification bias. In a few cases, when the maximum payload capacity is required or when a certain combination of FSC 204, FSB 206, and MFSB 208 is preferred, adding an Additional Payload Data Byte (APD) 214 to the OPUk OH 212 is another way to increase the payload capacity by one byte per frame (or per multi-frame for multiplexed signals). The APD 214 is not an additional negative justification opportunity because it always contains payload data.

The Justification Control and Interpretation Functions of the present invention require logic to encode and decode each justification state. The FSC 204, FSB 206, MFSB 208, and APD 214 are used to bias justification range so that no more than one negative and no more than four positive justification opportunities are required. The present invention includes circuitry configured to manage the various combinations of FSC 204, FSB 206, MFSB 208, and APD 214 for different payload capacities.

Figure 5:
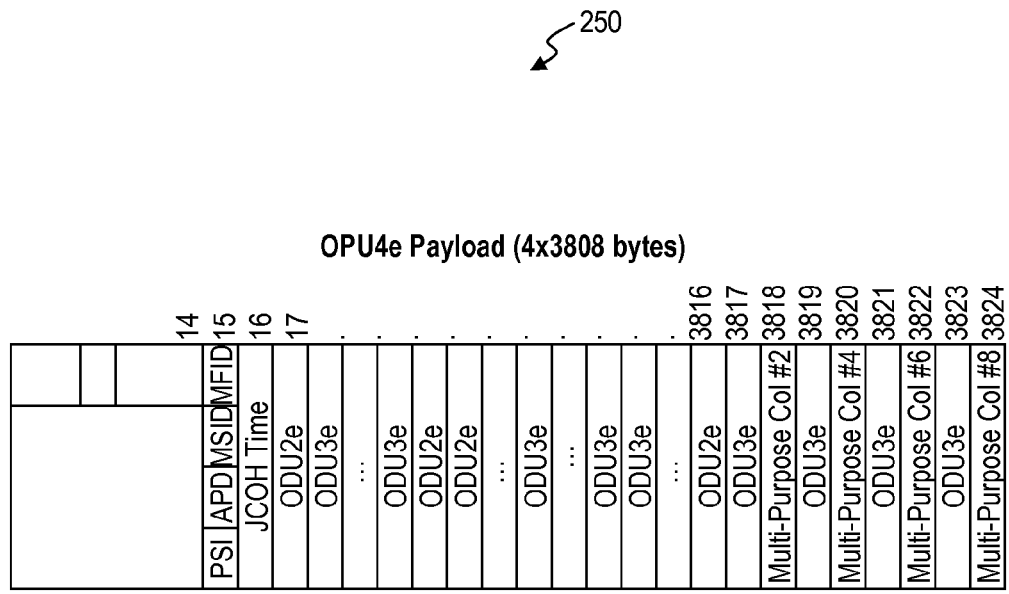
FIG. 5 is a timeslot diagram of an OPU4e payload according to an exemplary embodiment of the present invention.

Referring to FIG. 5, an OPU4e payload 250 is illustrated according to an exemplary embodiment of the present invention. Advantageously, the relationship between tributary and time slots in the present invention is not fixed as it is ITU-T G.709. The Multiplex Signal ID (MSID) in column 16, row 1, in the OPUk identifies the time slot group along with the ODUj level associated with each time slot. The OPU4e payload 250 is shown multiplexed with six ODU2e and an ODU3e tributary. The six ODU2e tribs are provisioned, and the ODU3e can use what ever combination of time slots are open. Without the flexible assignment, some of the ODU2e would need to be re-groomed interrupting service to those ODU2e tributaries to add the ODU3e.

Referring to FIG. 6, a table illustrates MSID values 280 for various signal types according to an exemplary embodiment of the present invention. The MSID values 280 provide the type of signal, such as ODU1, ODU2, ODU3, ODU2-GbE, ODU2-GbES, ODU3-GbE, ODU4-GbE, and the like, and the associated time slot group, e.g. 0 to 39, 0 to 9, 0 to 1, etc. For example, the ODU1 can be in groups 0 to 39.

Referring to FIG. 7, tables are illustrated depicting signal rates with three digit M and N 300 and alternate signal rates derived with many digit M and N 310 according to an exemplary embodiment of the present invention. M and N are used in a ratio and multiplied by the OTN signal rate to derive a signal rate in a constant bit rate (CBR) process for various different client signals. OTN defines a CBR2G5 as a constant bit-rate signal of 2,488,320 kb/s +/−20 ppm, a CBR10G as a constant bit-rate signal of 9,953,280 kb/s +/31 20 ppm, and a CBR40G as a constant bit-rate signal of 39,813,120 kb/s +/−20 ppm.

The present invention defines a CBR10G3125 as a constant bit-rate signal of 10.3125 Gb/s +/−100 ppm, a CBR41G25 as a constant bit-rate signal of 41.2500 Gb/s +/−100 ppm, and a CBG1G25 as a constant bit-rate signal of 1.2500 Gb/s +/−100 ppm. The CBR10G3125 is utilized for deriving signal rates for OPU2L, ODU2L, OTU2L, OPU2e, ODU2e, and OTU2e to support full transparency of datacom signals (e.g., LAN-PHY rates). The CBR41G25 is utilized for deriving signal rates of OPU3e, ODU3e, and OTU3e to support full transparency of datacom signals, and the CBG1G25 is utilized for deriving signal rates of OPU1e, ODU1e, and OTU1e. The alternate signal rates derived with many digit M and N 310 can be utilized for deriving alternate signal rates associated with 40 GbE and 100 GbE.

The client nomenclature and the telecom and datacom signal equivalent are as follows:

| Client Nomenclature | Telecom and Datacom signal equivalent |
| --- | --- |
| CBR103G125 | Proposed Ethernet 100GBASE-L (aka LAN-PHY) operating at 10.3125 Gb/s |
| CBR41G25 | Proposed Ethernet 40GBASE-L (aka LAN-PHY) operating at 41.25 Gb/s |
| CBR40G | Proposed Ethernet 40GBASE-W (aka WAN-PHY) operating at 39.8131 Gb/s |
| | Ethernet over SONET (EoS) (OC768/STM256) operating at 39.8131 Gb/s |
| | Packet over SONET (PoS) (OC768/STM256) operating at 39.8131 Gb/s |
| | SONET OC768 operating at 39.8131 Gb/s |
| | SDH STM256 operating at 39.8131 Gb/s |
| | OTN RS256 operating at 39.8131 Gb/s |
| CBR10G3125 | Ethernet 10GBASE-L (aka LAN-PHY) operating at 10.3125 Gb/s |
| CBR10G | Ethernet 10GBASE-W (aka WAN-PHY) operating at 9.9533 Gb/s |
| | Ethernet over SONET (EoS) (OC192/STM64) operating at 9.9533 Gb/s |

-continued

| Client Nomenclature | Telecom and Datacom signal equivalent |
| --- | --- |
| | Packet over SONET (PoS) (OC192/STM64) operating at 9.9533 Gb/s |
| | SONET OC192 operating at 9.9533 Gb/s |
| | SDH STM64 operating at 9.9533 Gb/s |
| | OTN RS64 operating at 9.9533 Gb/s |
| CBR2G5 | Ethernet over SONET (EoS) (OC48/STM16) operating at 2.48832 Gb/s |
| | Packet over SONET (PoS) (OC48/STM16) operating at 2.48832 Gb/s |
| | SONET OC48 operating at 2.48832 Gb/s |
| | SDH STM16 operating at 2.48832 Gb/s |
| | OTN RS16 operating at 2.48832 Gb/s |
| CBR1G25 | Ethernet 1GBASE-L (aka LAN-PHY) operating at 1.25 Gb/s |
| OTU2L | Extended rate OTN Formatted signals carrying bit transparent 10GBE |
| ODU2L | signal using M/N of 255/238, 239/238 and 238/238 respectively. |
| OPU2L | |
| OTU2e | Extended rate OTN Formatted signals carrying bit transparent 10GBE |
| ODU2e | signal using M/N of 255/237, 239/237 and 238/237 respectively. |
| OPU2e | |

Referring to FIG. 8, a table illustrates mapping and multiplexing formats 350 according to an exemplary embodiment of the present invention. The table shows the number of columns used, the number of fixed stuff columns, the number of fixed stuff bytes, the number of multi-frame stuff bytes, and the number of additional payload bytes used. For ODU1 to ODU2 and ODU2 to ODU3 multiplexing, no stuff bytes or additional payload is required.

Referring to FIG. 9, tables illustrate mapping 400 and multiplexing 410 of a 112 G OTU4e signal according to another exemplary embodiment of the present invention. The 112 G OTU4e has a signal rate of 112,379,807,692 b/s which equals 103.125 Gb/s*255/234. A 112G ODU4e has a signal rate of 105,328,525,641 b/s which equals 103.125*239/234. The 112 G OTU4e and 112 G ODU4e provide all mappings in 3800 columns or less. To map a 100 GbE signal into the 112 G ODU4e with 3800 columns, 55 fixed stuff columns are required for positive justification only or 56 fixed stuff columns for justification between 2 NJO to 2 PJO.

Sample multiplexing 410 formats for the 112 G OTU4e include multiplexing an ODU3e into the 112 G ODU4e, an ODU2 into the 112 G ODU4e, an ODU1 into an 112 G ODU4e, an ODU2e into an 112 G ODU4e, an ODU2L into an 112 G ODU4e, an ODU3e into an 112 G ODU4e, an ODU2-fibre channel 10 G (ODU2FC10) into an 112 G ODU4e, and an ODU2-fibre channel 8 G (ODU2FC8) into an 112 G ODU4e. The table in FIG. 9 illustrates the container, number of columns used for tributaries, and the number of fixed stuff columns and bytes.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. An Optical Transport Network multiplexing method for full transparent transport of datacom and telecom signals, comprising:

receiving one or more client signals;

assigning the one or more client signals to a set of time slots of a plurality of time slots in an Optical Channel Payload Unit;

utilizing one or more fixed stuff columns as a coarse adjustment and one or more fixed stuff bytes, multi-frame stuff bytes, and/or additional payload bytes as a fine adjustment to bias a justification range required for the one or more client signals in the set of time slots, wherein the additional payload bytes are overhead bytes containing payload;

utilizing the fixed stuff columns, fixed stuff bytes, multi-frame stuff bytes, and/or additional payload bytes to bias the justification range such that no more than one negative and no more than four positive justification opportunities are required;

utilizing a multiplex signal identification in an Optical Channel Payload Unit overhead that is synchronized to a multi-frame identification also in the Optical Channel Payload Unit overhead to indicate the assignment of the one or more client signals to a tributary identification and a level for each time slot; and utilizing shared justification control overhead that is also synchronized to the multi-frame identification.

2. The Optical Transport Network multiplexing method of claim 1, wherein the multiplexing method supports synchronous and asynchronous transparent transport of +/−100 parts per million signals.

3. The Optical Transport Network multiplexing method of claim 1, wherein the fixed stuff columns are added to a payload area per frame of the Optical Channel Payload Unit as required for coarse adjustments;

wherein one to three fixed stuff bytes are added to a column in the payload area as required;

wherein the multi-frame stuff bytes are added to one or more frames in a multi-frame as required; and wherein the additional payload byte is added to an Optical Channel Payload Unit overhead as required to increase payload capacity by one byte per frame.

4. The Optical Transport Network multiplexing method of claim 1, further comprising:

utilizing the multiplex signal identification in the Optical Channel Payload Unit overhead to indicate the assignment of the one or more client signals to the set of time slots.

5. The Optical Transport Network multiplexing method of claim 4, wherein the multiplex signal identification in the Optical Channel Payload Unit overhead enables flexible time slot assignment of the one or more client signals.

6. The Optical Transport Network multiplexing method of claim 4, further comprising:

utilizing a multi-frame identification in the Optical Channel Payload Unit overhead to support ×2, ×4, ×5, ×10, ×16, ×20, ×32, ×40, ×80, ×160, and combinations thereof multiplexing of the one or more client signals.

7. The Optical Transport Network multiplexing method of claim 1, further comprising:

mapping the Optical Channel Payload Unit into an Optical Channel Data Unit; and mapping the Optical Channel Data Unit into an Optical Channel Transport Unit.

8. The Optical Transport Network multiplexing method of claim 7, wherein the Optical Channel Transport Unit comprise an Optical Channel Transport Unit-4-extended (OUT4e), wherein the OUT4e comprises one of a signal rate of 103.125 Gb/s * 255/235 and a signal rate of 103.125 Gb/s*255/234;

wherein the Optical Channel Data Unit comprise an Optical Channel Data Unit-4-extended (ODU4e); and wherein the Optical Channel Payload Unit comprise an the Optical Channel Payload Unit-4-extended (OPU4e), wherein the OPU4e comprises forty time slots and eight multi-purpose columns.

9. An Optical Transport Network mapping method for full transparent transport of datacom and telecom signals, comprising:

receiving a client signal;

assigning the client signal to an Optical Channel Payload Unit;

utilizing one or more fixed stuff columns as a coarse adjustment and one or more fixed stuff bytes, multi-frame stuff bytes, and/or additional payload bytes as a fine adjustment to bias a justification range required for the client signal in the Optical Channel Payload Unit, wherein the additional payload bytes are overhead bytes containing payload;

utilizing the fixed stuff columns, fixed stuff bytes, multi-frame stuff bytes, and/or additional payload bytes to bias the justification range such that no more than one negative and no more than four positive justification opportunities are required;

utilizing a multiplex signal identification in an Optical Channel Payload Unit overhead that is synchronized to a multi-frame identification also in the Optical Channel Payload Unit overhead to indicate the assignment of the client signal to a tributary identification and a level for each time slot; and utilizing shared justification control overhead that is also synchronized to the multi-frame identification.

10. The Optical Transport Network mapping method of claim 9, wherein the mapping method supports synchronous and asynchronous transparent transport of +/−100 parts per million signals.

11. The Optical Transport Network mapping method of claim 9, wherein the fixed stuff columns are added to a payload area per frame of the Optical Channel Payload Unit as required for coarse adjustments;

wherein one to three fixed stuff bytes are added to a column in the payload area as required;

wherein the multi-frame stuff bytes are added to one or more frames in a multi-frame as required; and wherein the additional payload byte is added to an Optical Channel Payload Unit overhead as required to increase payload capacity by one byte per frame.

12. The Optical Transport Network mapping method of claim 9, further comprising:

mapping the Optical Channel Payload Unit into an Optical Channel Data Unit; and mapping the Optical Channel Data Unit into an Optical Channel Transport Unit.

13. The Optical Transport Network mapping method of claim 9, wherein the client signal comprises one of a 10 Gigabit Ethernet, a 40 Gigabit Ethernet, a 100 Gigabit Ethernet, a 10 Gigabit Fibre Channel, and a 8 Gigabit Fibre Channel.

14. The Optical Transport Network mapping method of claim 9, wherein the Optical Channel Transport Unit comprise an Optical Channel Transport Unit-4-extended (OUT4e), wherein the OTU4e comprises one of a signal rate of 103.125 Gb/s*255/235 and a signal rate of 103.125 Gb/s*255/234;

wherein the Optical Channel Data Unit comprise an Optical Channel Data Unit-4-extended (ODU4e); and wherein the Optical Channel Payload Unit comprise an the Optical Channel Payload Unit-4-extended (OPU4e), wherein the OPU4e comprises forty time slots and eight multi-purpose columns.

15. An Optical Transport Network element for full transparent transport of datacom and telecom signals, comprising:

a tributary interface configured to receive a client signal comprising one of a plurality of client signal types; and a line interface coupled to the tributary interface, wherein the line interface is configured to output the client signal in an Optical Transport Network frame, wherein the client signal is fully transparent within the Optical Transport Network frame, and wherein the Optical Transport Network frame utilizes an increased rate;

wherein the Optical Transport Network element utilizes one or more fixed stuff columns as a coarse adjustment and one or more fixed stuff bytes, multi-frame stuff bytes, and/or additional payload bytes as a fine adjustment to bias a justification range required for the client signal in the Optical Transport Network frame, wherein the additional payload bytes are overhead bytes containing payload;

wherein the Optical Transport Network element utilizes the fixed stuff columns, fixed stuff bytes, multi-frame stuff bytes, and/or additional payload bytes to bias the justification range such that no more than one negative and no more than four positive justification opportunities are required;

wherein the Optical Transport Network element utilizes a multiplex signal identification in an Optical Channel Payload Unit overhead that is synchronized to a multi-frame identification also in the Optical Channel Payload Unit overhead to indicate the assignment of the client signal to a tributary identification and a level for each time slot and wherein the Optical Transport Network element utilizes shared justification control overhead that is also synchronized to the multi-frame identification.

16. The Optical Transport Network element of claim 15, wherein the line interface supports synchronous and asynchronous transparent transport of +/−100 parts per million signals.

17. The Optical Transport Network element of claim 15, wherein the fixed stuff columns are added to a payload area per frame of an Optical Channel Payload Unit as required for coarse adjustments;

wherein one to three fixed stuff bytes are added to a column in the payload area as required;

wherein the multi-frame stuff bytes are added to one or more frames in a multi-frame as required; and wherein the additional payload byte is added to an Optical Channel Payload Unit overhead as required to increase payload capacity by one byte per frame.

18. The Optical Transport Network element of claim 15, wherein the Optical Transport Network element is configured to:

map the client signal into an Optical Channel Payload Unit;

map the Optical Channel Payload Unit into an Optical Channel Data Unit; and map the Optical Channel Data Unit into an Optical Channel Transport Unit.

19. The Optical Transport Network element of claim 15, wherein the client signal comprises one of a 10 Gigabit Ethernet, a 40 Gigabit Ethernet, a 100 Gigabit Ethernet, a 10 Gigabit Fibre Channel, and a 8 Gigabit Fibre Channel.

* * * * *